Patented Aug. 29, 1944

2,357,149

UNITED STATES PATENT OFFICE 2,357,149

PROCESS FOR THE PRODUCTION OF THIOUREA

Jacob van de Kamp, Westfield, N. J., assignor to Merck & Co., Inc., Rahway, N. J., a corporation of New Jersey No Drawing. Application July 30, 1941,
Serial No. 404,657

3 Claims. (Cl. 260—552)

This invention relates to an improved process for the production of thiourea.

Numerous processes have been proposed heretofore for the production of thiourea, involving the action of hydrogen sulfide on cyanamide, but such prior art processes have many disadvantages.

I have discovered that thiourea may be produced by a simple and efficient process, involving reactants which are inexpensive and readily available, which process may be utilized for large scale commercial manufacture without the necessity of special equipment, such as the pressure equipment required in carrying out processes involving the use of gases.

According to my improved method, calcium chloride, sodium sulfide, and calcium cyanamide are reacted in concentrated aqueous solution to produce thiourea. The reaction proceeds smoothly and rapidly, and results in over 90% yield.

The following examples illustrate a method of carrying out the present invention, but it is to be understood that these examples are given by way of illustration and not of limitation.

Example I 312 gms. of sodium sulfide, techn. flakes, 60–62% are stirred into 480 cc. of water at 60° C. 270 gms. of calcium cyanamide, techn. (58–60%, 20.3% N) are added with good stirring. In the course of 20–30 minutes, a warm (100° C.) solution of 288 gms. of calcium chloride (dry granular) in 240 cc. of water are added. When all of the calcium chloride is added, the temperature is adjusted to 75–80° C. and maintained for about one hour. The reaction mixture is diluted with 500 cc. of water, the temperature again brought to 80° C., and the mixture filtered hot. The dark-gray cake on the filter is extracted twice with 400 cc. of water at 80° C. On cooling to 0° C., the filtrate deposits crystals which are removed by suction, and washed white on the filter with a small amount of ice cold 95% ethanol. The crystals are then washed with ether, and dried. Yield, 63.9 gms.; melting point 176–7° C. The yellow filtrate of the first crop and the two water extracts are combined and treated with 100 cc. of 50% sulfuric acid. A small quantity of sulfur is precipitated and a small amount of hydrogen sulfide is evolved, and the yellow color disappears. The sulfur is removed by filtration. The clear, warm, colorless solution remaining is stirred with 50 gms. of sodium carbonate in 150 cc. of water at 60° C. Calcium carbonate is precipitated, and when it becomes crystalline, is filtered off. The clear colorless filtrate is concentrated to dryness. The dry residue is extracted with 500+250+100 cc. of 95% ethanol. The alcoholic extract is cooled and concentrated. 70.4 gms. of thiourea of melting point 174–6° C. is obtained. The total yield of thiourea obtained is 134.3 gms.

Example II 286 gms. of sodium sulfide (techn. flakes 60–62%; 2.2 moles) are stirred into 480 cc. of water at 60° C. 270 gms. of calcium cyanamide (58–60% containing 20.3% nitrogen; 2 moles) are then added with good stirring. In the course of 3 to 5 minutes, a warm (100° C.) solution of 264 gms. of dry granular calcium chloride in 240 cc. of water are added. The reaction is carried out in a closed system. The mixture is maintained at 75–80° C. for one hour, then diluted with 500 cc. of water, the temperature brought to 80° C. again, and the mixture is filtered hot. The dark gray cake on the filter is extracted twice with 400 cc. of warm water (80° C.).

The combined filtrates (light brown in color) are treated warm with 65 cc. of concentrated hydrochloric acid to decompose the polysulfides. Some sulfur separates out, the liquid becomes colorless, and some hydrogen sulfide is evolved. The reaction mixture is boiled for about 20 minutes to remove hydrogen sulfide. The aqueous solution is concentrated to half its volume, and the liquid containing the precipitated sulfur is treated hot with just enough sodium carbonate solution to precipitate all the calcium present as calcium carbonate. The mixture is filtered while hot from calcium carbonate and sulfur in one operation. The filtrate (colorless and free of hydrogen sulfide) is titrated with N/10 iodine solution. It contains 1.8 moles of thiourea.

The solution may be evaporated to dryness and the thiourea extracted with alcohol.

Thiourea may be utilized for a number of purposes. For example, it may be condensed with monochloracetaldehyde to produce aminothiazole.

The solution of thiourea obtained according to Example II may be concentrated until the inorganic salts and thiourea just remain in solution. The concentrated solution may be used in the condensation with monochloracetaldehyde to produce aminothiazole.

Modifications may be made in carrying out the present invention without departing from the spirit and scope thereof, and I am to be limited only by the appended claims.

I claim:

1. The process comprising heating sodium sulfide, calcium cyanamide, and calcium chloride in aqueous solution, at a temperature of about 75–80° C.

2. The process comprising heating sodium sulfide, calcium cyanamide, and calcium chloride in aqueous solution at a temperature of about 75–80° C,. and recovering thiourea.

3. The process comprising heating sodium sulfide, calcium cyanamide, and calcium chloride in aqueous solution at a temperature of about 75–80° C., and recovering a concentrated solution of thiourea.

JACOB van de KAMP.